Sept. 29, 1964 A. M. GRIFFITH 3,151,015

BEARINGS

Filed Jan. 30, 1961 5 Sheets-Sheet 1

INVENTOR.
ARVON M. GRIFFITH
BY
Wallace, Kinzer and Dorn
Att'ys.

INVENTOR.
ARVON M. GRIFFITH
BY
Wallace, Kinzer and Dorn
Attys.

Sept. 29, 1964 A. M. GRIFFITH 3,151,015

BEARINGS

Filed Jan. 30, 1961 5 Sheets-Sheet 3

INVENTOR.
ARVON M. GRIFFITH
BY Wallace, Kinzer & Dorn
Att'ys.

INVENTOR.
ARVON M. GRIFFITH
BY: Wallace, Kinzer & Dorn
Att'ys.

Sept. 29, 1964 A. M. GRIFFITH 3,151,015

BEARINGS

Filed Jan. 30, 1961 5 Sheets-Sheet 5

INVENTOR.

ARVON M. GRIFFITH

BY Wallace, Kinzer & Dorn

Att'ys.

3,151,015
BEARINGS

Arvon M. Griffith, Valley Cottage, N.Y., assignor to American Brake Shoe Company, New York, N.Y., a corporation of Delaware
Filed Jan. 30, 1961, Ser. No. 85,772
7 Claims. (Cl. 161—158)

This invention relates to a composition bearing or like element having an anti-friction surface characterized by Teflon resin, the term "composition" being used in contradistinction to metallic materials.

Teflon plastic or tetrafluoroethylene resin displays good anti-friction characteristics, but it is difficult to bond to a supporting member required as a practical matter when affording a bearing element or like mechanical element subject to stress and strain in use. Thus, the supporting member is necessary not only because of the objectionable expense of a bearing element entirely of Teflon resin, but also because unsupported Teflon resin displays objectionable cold flow under pressure such as is involved in bearing elements. In view of these problems, it has been proposed in Patent Nos. 2,804,886, 2,906,567 and 2,919,219 to interweave Teflon resin yarns with dissimilar supporting yarns such as cotton or the like serving as a material said to be easily bondable to another member in comparison to the Teflon yarns.

Such compound woven bearings including Teflon yarns are expensive because of the special weaving techniques involved, and while there have been other proposals, the compound woven materials exemplified by the foregoing patents are, to the best of my knowledge, the only feasible commercial materials so far developed prior to the present invention for general use in bearings. In other words, those skilled in the art have for different reasons deemed it impractical to have resort to a Teflon plastic or resin coating in a resilient composition bearing, which is by far the least expensive approach, and the primary object of the present invention is to enable this to be accomplished in a shock-resistant bearing or like anti-friction element of the fabric reinforced resin type wherein the effective bearing or low-friction surface is composed essentially of Teflon resin applied as a coating. Thus, the bearing of the present invention in one form is characterized by a plurality of plies of woven fabric, and the outermost lamina bears Teflon resin in a unique condition. A fabric resin-reinforced bearing according to this invention may, however, be composed of but a single fabric layer. Strong woven fabrics are preferred, such as cotton duck, but the fabric can be of the unwoven type such as fiberglass, asbestos sheets and the like wherein the fabric strands are loosely associated in contra-distinction to woven fabric strands or yarns. The Teflon resin in any event is applied to the fabric material initially in a liquid vehicle, but in a way which is distinguished from impregnation.

Thus, under the present invention a shock-resistant or shock-absorbing fabric backing enables sudden thrusts and heavy loading, characterizing conditions normally giving rise to rapid wear of the low-friction material, to be absorbed without appreciable wearing of the Teflon plastic bearing surface. As a consequence and particularly in the instance of laminated backing structure, it is not necessary to restort to supplemental Teflon coatings or impregnations inward of the outermost lamina, although it is conceivable that there are situations where it will be advantageous to have both of the outer lamina coated to bear Teflon resin particles. Even in this latter event, however, the inward lamina are devoid of purposely applied Teflon coatings. Such arrangement constitutes another object of the present invention.

In United States Patent No. 2,843,502, coatings of various substrates with a specially formulated polytetrafluoroethylene dispersion are described. No differentiation between substrates is implied therein, but I have discovered under the present invention that in order to achieve an effective bearing it is essential to restort to a composition or fabric backing (that is, essentially non-metallic) and important to have the fabric impregnated with and bonded by a thermosetting resin, with a coating applied thereto from commercially available Teflon materials. Thermosetting resin or equivalent bonding material is present at the face of the fabric structure, and the Teflon resin is pressed in situ therein. An unexpected, improved result is achieved apparently by the cooperation of the Teflon resin and the composition, fabric substrate as will be disclosed in greater detail subsequently.

Specifically, a bearing of the present invention is molded under heat and pressure and lamina are bonded one to another by a thermosetting resin advanced to its final stage of cure during such heat and pressure molding. It is essential to apply the Teflon resin coating to the outer lamina prior to molding the assembly under heat and pressure, and resultantly the Teflon resin, at the bearing surface is pressed in situ during molding. The Teflon resin may be applied as a water dispersion of fine Teflon resin particles, or the Teflon resin as applied can be large particles in a liquid resin carrier. In this arrangement, the subsurface or substrate laminae afford the necessary resilience and conformability that lessens wearing or abrading of the Teflon resin during use, and further assures conformability of the bearing as a whole to concentrated pressures involved during use, thereby preventing crushing of the Teflon resin material at the bearing surface. As shown by data hereinafter, the advantageous results of the present invention are realized by applying the Teflon resin coating prior to molding the assembly, and of course during this molding operation the bonding resin is advanced to its final bond state. This also applies to the resin vehicle in which the Teflon resin may be carried as will be explained. Such constitutes another important object of the present invention.

It is important to realize that the Teflon resin in the present instance is not used as an impregnant. In fact, the preferred state of the fabric backing material to which the Teflon resin is applied and pressed under the present invention is substantially unimpregnable when the Teflon resin is applied, being already quite saturated with a phenolic bonding resin in a B-stage of cure. Thus, the fabric backing is quite heavily loaded and impregnated as a whole with a thermosetting bonding resin, although it is not essential that the individual strands composing the backing be impregnated thoroughly.

Of course I am using "Teflon" as the trademark designation of polytetrafluoroethylene or so-called tetrafluoroethylene resin disclosed in United States Patent No. 2,230,654.

Bearing elements of the present invention are particularly useful in automobile ball joint original equipment installations where they are subjected to a great deal of mechanical abuse. This is especially so in sports cars. Such installations are difficult to service and lubricate and it is therefore desirable to have a bearing element that will have a long life and which need have little if any lubrication applied. These specifications are met under the present invention.

Other and further objects of the present invention will be apparent from the following description and claims and are illustrated in the accompanying drawing which, by way of illustration, shown preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figures 1, 2, 2A, 4, 4A, 4B:
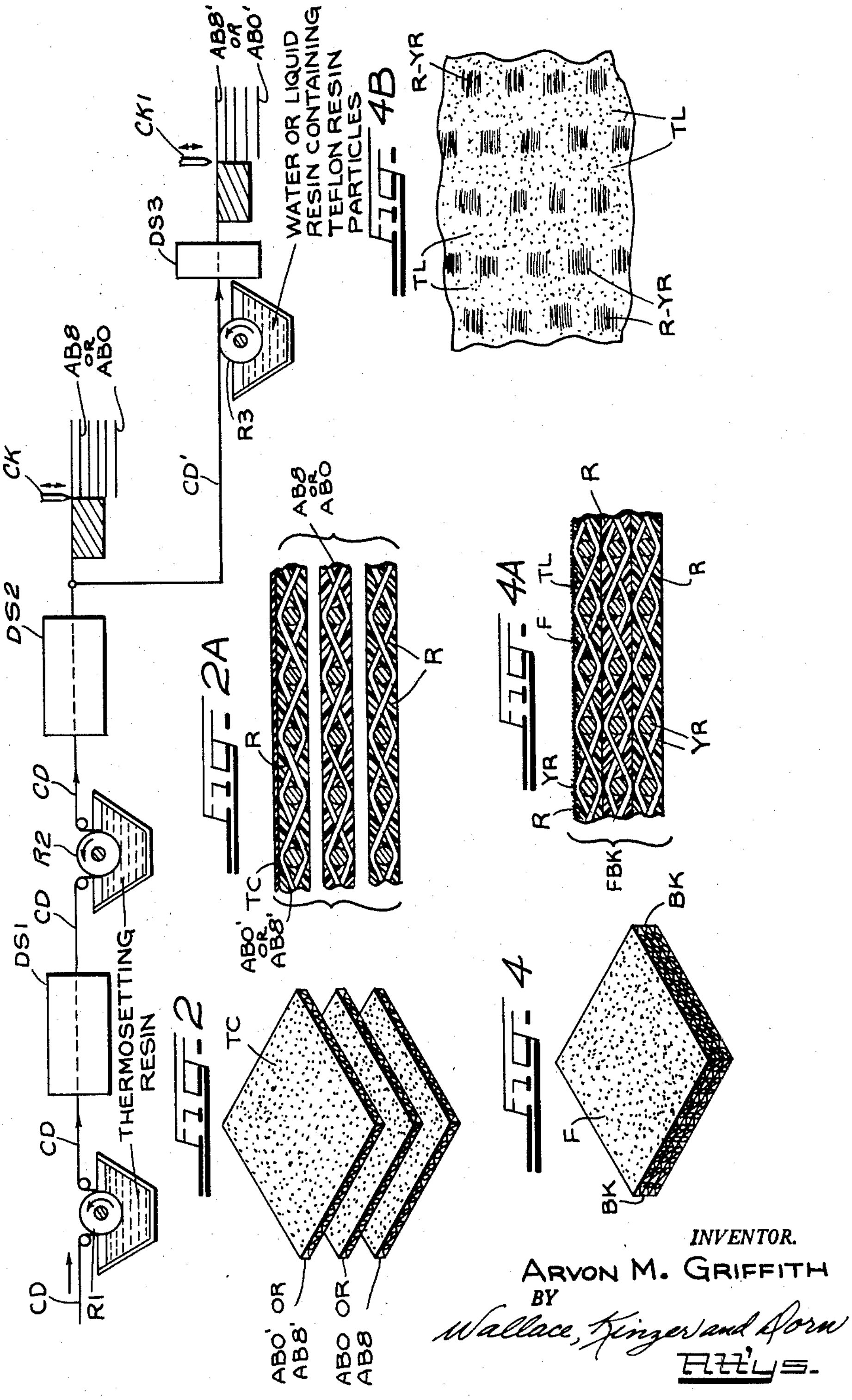
FIG. 1 is a diagrammatic view showing the general manner of processing woven fabric stock incidental to obtaining treated fabric strips for bearings and like elements under the present invention.
FIG. 2 is a perspective view of a typical assembly of woven fabric strips to be consolidated into a bearing in accordance with the present invention.
FIG. 2A is a sectional view of the assembly shown in FIG. 2.
FIG. 4 is a perspective view of the finished bearing removed from the mold shown in FIG. 3.
FIG. 4A is a fragmentary sectional view, on an enlarged scale, of the bearing surface of the bearing shown in FIG. 4.
FIG. 4B is a view of the bearing surface of the bearing shown in FIG. 4A.

Under the present invention, Teflon resin particles in a liquid vehicle are applied as a coating to the outer face of a fabric backing which is to afford the bearing surface in a composition bearing or like element of the fabric type. This coating is applied before the fabric is molded and consolidated into the desired bearing shape, and consequently, the Teflon resin is formed into a substantially continuous network-like surface structure during final molding of the materials for the bearing when the Teflon resin is applied in the form of a water dispersion of submacroscopic particle size. As will be described in detail hereinafter, if larger, fused Teflon particles are employed in a thermosetting resin vehicle or the like, the bearing surface then will be composed of discrete islands of Teflon particles embedded in a matrix composed of the resin vehicle and, in some instances, resin-fabric composite structure which extend to the bearing surface. It will be understood that the term "thermosetting" resin as used herein is intended to include such materials as the phenol-aldehyde resins, the urea-aldehyde resins, the epoxy-type resins, the melamine resins, and equivalents of the foregoing.

A significant aspect of the present invention is that a relatively thick laminated fabric backing member enables shocks to be absorbed when the bearing is functioning in the commercial mechanical structure involved, and consequently objectionable crushing or significant cold flow of the particulate Teflon composing the relatively thin low friction surface is prevented. At the same time, the degree of inherent resilience afforded by the laminated backing reduces wearing or erosion of the Teflon particles, and it appears that another advantageous result of having the Teflon particles pressed in-situ as mentioned above is that the fabric yarns and/or columns or blocks of thermosetting bonding resin may be forced in among the openings in the Teflon resin network aforesaid thereby supporting and anchoring the same.

By whatever technique the Teflon resin is applied, it is eventually pressed in situ at the bearing face of the fabric backing during heat and pressure molding thereof, and is pressed into a resin matrix at this face of the backing, portions of the resin at the face of the bearing dividing or separating the Teflon resin as will be evident in the drawings, or, what is the same thing, resin impregnated fabric at the face of the bearing separates and divides the Teflon material. The resin matrix may be the bonding resin for the fabric backing or the aforesaid resin vehicle for the large fused Teflon resin particles and this resin matrix when cured will firmly anchor the Teflon resin particles.

As will be shown by data tabulated hereinbelow, a metallic backing such as steel coated with a Teflon resin does not display practical bearing properties; to the contrary, the bearing element of the present invention is characterized by a backing of fabric material such as cotton duck or the like, which may comprise a plurality of layers or plies, preferably extensively loaded and impregnated with a bonding resin of the thermosetting type during the course of preliminary manufacture.

Thus, referring to FIG. 1 of the drawing, an endless band of woven cotton duck CD of the desired weight and in the form obtained from the weaving mill is first run under a coating roller R1 which impregnates or fills the fabric with a suitable thermosetting resin which, for example, may be a phenol-formaldehyde resin in an alcohol soluble stage. Advantageously, but not essential under the present invention as will be apparent hereinafter, the thermosetting bonding resin applied by the roller R1 (and roller R2 hereinafter) has graphite, molybdenum sulphide or other solid lubricant dispersed therein to be applied to the strip CD simultaneously with the bonding resin.

After the first application of bonding resin, and solid lubricant if desired, the resin containing strip CD is advanced to a drying station DS1 where the phenolic resin is partially cured to a "B" stage short of its final or complete thermoset condition. As the dried cotton duck emerges from the drying station DS1, it may be again treated with more of the same bonding resin by a roller R2, and thereafter passed through a second drying station DS2 where additional heat is applied to further advance the phenol-formaldehyde resin, but nevertheless again short of the finally cured or infusible stage. Two-stage operation results in a high degree of saturation of the fabric with resin, but a one-stage operation involving only roller R1 can be used, primarily depending upon the fabric involved and the degree of resin saturation which is optimum. This completes preparation of the stock material that is to afford the laminae or a single fabric strip for bearing elements of the present invention, and the stock strip is severed into desired lengths by a cutting knife CK as illustrated in FIG. 1.

It will be appreciated that what is shown in FIG. 1 is a diagrammatic illustration showing one mode of treatment for the fabric strips that are to afford backings in accordance with the present invention, and while the impregnating apparatus and drying stations have been referred to in conjunction with a final cutting station as a continuous operation, it will be appreciated that these are merely exemplary of the functional relationships involved, and consequently resort can be had to any desired procedure. In this connection it will be noted that the severed strips obtained at the cutting station are identified as being of the AB8 or AB0 form. These specific materials will be referred to in detail hereinafter for a complete disclosure, but it should here be mentioned that the AB8 strip is one that is impregnated with both a resin and a solid lubricant such as graphite above described, whereas the AB0 strips are merely impregnated with the thermosetting resin that does not contain dispersed solid lubricant. Thus, there may be some circumstances where it is desirable to have a lubricant in the backing in addition to the Teflon resin low friction surface to be referred to hereinafter. In other instances, such measures may not be necessary, particularly where low mechanical stressing is involved, and therefore it is not necessary to have resort to supplementary solid lubricant in the alternate form of the strip represented by reference character AB0.

In accordance with one aspect of the present invention, cotton duck strips impregnated with a phenolic or other thermosetting resin in an incompletely cured stage, and prior to being molded, are coated with Teflon particles in a liquid dispersion. Thus, selected of the above-identified resin-impregnated strips are to be coated in this manner, and each selected piece so coated is to become the outer strip, layer, or lamina of the resultant bearing, depending upon the thickness desired for the particular bearing. The precise way in which the coating procedure is carried out will depend upon the nature of the ultimate form of the bearing element. Thus, in some instances it may only be necessary to hand coat or paint the outer lamina strip with the liquid vehicle containing the Teflon resin particles. On the other hand, and especially where continuous processing or mass production items are involved, the production line diagrammed in FIG. 1 can be extended, and this can be visualized as an extended run CD′, FIG. 1, for a selected length of the impregnated cotton duck stock strip as it emerges from the second drying station DS2, or from the first drying station if a single impregnating pass is used. Thus, the portion of the strip CD′ that is to be used as a source of Teflon resin containing strips is run over a coating roller R3 which applies a coating of Teflon "30" to be hereinafter specifically identified, or relatively large size fused Teflon particles dispersed in an epoxy or phenolic or other suitable thermosetting resin, applied by the roller R3. After drying, as at station DS3, the strip CD′, now bearing the Teflon resin particles, is passed beneath a cutting knife CK′ which severs the desired short lengths AB8′ (resin and graphite impregnated) or AB0′ (impregnated only with the bonding resin). Station D3 advantageously includes a circulating air oven, but the temperature is merely that required to evaporate the water vehicle, if such is used as a carrier for the Teflon particles, or to advance the epoxy or equivalent resin to a non-tacky state if such be used as a vehicle for large size Teflon particles. In any event, the temperature is below that which will completely cure any resins present.

Additional coating and drying techniques will be mentioned hereinafter, particularly in connection with backings of but a single layer.

Figure 3:
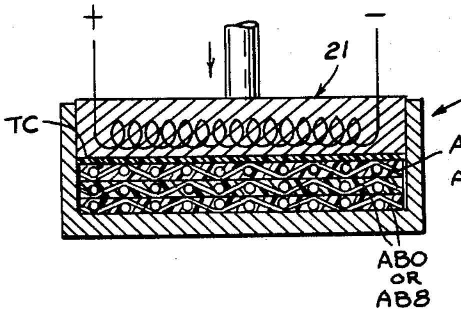
FIG. 3 shows a typical molding operation involved.

The strips AB8 or AB0 thus obtained are to serve as individual lamina to afford various shapes of bearings illustrated in FIGS. 4 and 6 to 8, although single layer elements are possible as will be mentioned. Thus, a bearing or like element having a low friction surface under the present invention can comprise three flat strips, FIG. 2, of equal dimension and rectangular shape that are to be juxtaposed one on the other in a mold 20, FIG. 3. An important and practical feature of the present invention in this regard is that the outermost lamina alone need bear the Teflon particles affording the low friction surface, and such lamina in FIG. 2 is identified as being of the AB8′ or AB0′ form. Referring to FIG. 2A, which is an enlarged section of the strip shown in FIG. 2, the intermediate lamina is solely of resin impregnated cotton duck which may or may not contain graphite, and this also applies to the outermost lower lamina. However, the outermost upper lamina is coated with Teflon particles in a liquid vehicle identified as TC, but it is important to realize that this is a mere coating and not an impregnation that significantly penetrates the outer layer, especially in view of the fact that the already partially advanced resin R in this outermost lamina (and the other laminae as well) prevents any substantial penetration by the Teflon resin coating.

The multiple laminants thus afforded are placed in the mold 20 which has a rectangular cavity complemental to the assembly to be laminated and consolidated. Thereafter, a platen 21 is rammed under high pressure in the mold cavity to apply the desired degree of pressure, and resistance elements or other heating means are utilized in association with the platen (or the mold box) to establish the desired curing temperature to advance the phenolic bondng resin to its finally cured and effective state. In other words, the bonding resin is finally cured by the simultaneous action of heat and pressure to its infusible stage.

The molding temperature will depend upon the thickness of the element being formed and the extent to which the bonding resin was advanced during the one or two drying stages referred to above. In this connection, it is to be stressed that the procedure referred to above in connection with FIG. 1 is merely exemplary of one mode of production which enables a great deal of the bonding resin, as well as the solid internal lubricant where used, to be impregnated in the cotton duck stock. If lesser amounts of bonding resin are required, the cotton duck to be impregnated with the bonding resin can be impregnated in but one step as has been mentioned, whereafter the bonding resin can be allowed merely to air dry followed by application of the Teflon resin coating to the outer face of an outer lamina and drying thereof prior to assembling the laminae in the mold as 20. This also applies to the procedures hereinafter disclosed.

In any event, after the desired level of heat and pressure have been established in the mold 20 for a sufficient period of time to completely cure the bonding resin and consolidate the various laminae into the finished bearing element and to press and anchor the Teflon resin particles well into the surface of the bearing, the product removed from the mold is typified by what is shown in FIGS. 4 and 4A. Thus, the bearing at its finished state has the various laminae firmly united into a unitary body or backing BK, FIGS. 4 and 4A, and the Teflon resin, as represented by the stippled facing F in FIGS. 4 and 4A, is now pressed and embedded in resin at the outer surface of the bearing. This resin will be the resin impregnant in the fabric where a Teflon resin water dispersion was used, or it will be the resin vehicle carrier where the larger, fused Teflon particles are used, as will be evident hereinafter and particularly in connection with the photomicrographs to be described.

Referring further to FIGS. 4A and 4B, which are fragmentary views of FIG. 4 on an enlarged scale, such depict a microscope observed condition wherein the Teflon resin material TL, obtained by way of a water dispersion coating, is a continuous network secured and locked in place by thermosetting resin R or portions of the resin-impregnated yarns YR in the outermost lamina which may be lodged among the in situ pressed Teflon particles at the bearing surface.

As mentioned above, the liquid vehicle for spreading the Teflon in the first instance can be of various different forms represented at the outside extremes by water on one hand and an epoxy, or phenol-formaldehyde, or equivalent thermosetting resin on the other hand. Advantageously, however, the Teflon resin to be spread or coated in the first instance can be in the form known as Teflon "30" marketed by Du Pont Company. This is a well-known coating form of Teflon resin characterized by approximately 60% Teflon resin solids (colloidal particles) by weight and stabilized with a minor amount of a non-ionic wetting agent, such being typified by the disclosure in United States Patent No. 2,843,502. Alternatively, larger, pulverized Teflon resin particles can be obtained by fusing commercially produced, fine Teflon resin particles and then grinding the fused microscopic product to obtain the larger chunks which can be dispersed in a thermosetting resin. In any event, I find that it is apparently important that the Teflon material for the bearing surface under the present invention be present in at least 0.02 gram per square inch since I have found that 0.01 gram per square inch of Teflon resin solids in the bearing surface is insufficient to provide the desired long-wearing, low friction surface. Such a distribution of solid or dry Teflon resin in the ultimate bearing element can be assured by resorting to particles of fused Teflon resin suspended in a thermosetting resin wherein the average transverse dimension of said particles will determine the effective thickness of the improved bearing surface. In other words, by resorting to Teflon resin particles of various sizes, such enables the thickness of the Teflon resin bearing surface to be selectively controlled for various operational expectancies.

As mentioned above, the weight or size or number of the cotton duck may be simply determined on the basis of expected mechanical requirements. For automotive ball joint use resort can be had to so-called 30-inch, 10.52 oz. cotton duck. Army duck can also be used in accordance with the following specifications:

Weight per square yard—12.55 oz.
Yarn size—warp 10/3 ply; fill 12/2 ply.
Ends per inch—48; picks per inch—36.
Tensile strength—warp 250 lbs.; fill 145 lbs.

While cotton duck is exemplary, other fabrics, commonly employed for laminates, can be used instead of cotton materials, and in fact the fabric need not be a woven fabric.

The bonding resin of a phenolic type is preferably a 60% resin solids solution in alcohol which may or may not contain graphite as mentioned above. Advantageously, the resin impregnant at the end of each of the curing stages illustrated in FIG. 1 undergoes a preliminary cure manifest in a 4% total volatile content of the resin impregnant. By 4% volatile content is meant a 4% loss in weight when the impregnated fabric is heated at 325° F. for ten minutes. It is important to assure that the resin is not completely cured in the preliminary drying operations, including the last drying stage where the Teflon coating is dried, since the resin fabric impregnant in the mold as 20 must be capable of flowing among the laminae to effect the desired bonding action, and if a resin vehicle is used for the Teflon resin coating this must be in an uncured condition prior to molding in order to unite with and bond to the fabric resin impregnant. The following is a specification of a phenolic-formaldehyde resin that may be used in accordance with the foregoing:

Specific gravity—1.060 to 1.065 at 25° C.—60% non-volatile in denatured alcohol.
Resin content—60%, plus or minus 1% in ethyl alcohol by ASTM D115–41 non-volatile test, or by cure loss test (*a*) hereunder.
Volatility—
- (*a*) Cure loss: 40% plus or minus 1%, two hours at 160° C. Two closed top crucibles suspended in electric oven.
- (*b*) Loss at 315° C.: 6% maximum using one cure loss crucible from (*a*) heated for one hour.
- (*c*) Loss at 370° C.: 11% maximum. Using second cure loss crucible from (*a*) heated for one hour.

Viscosity—350 to 450 centipoises at 25° C.
Hot plate set time—20 to 30 seconds at 160° C.

Example 1 hereinbelow is a typical impregnating solution to be applied by the rollers R1 and R2, and Example 2 is the solution to be applied by roller R3 to any of the cotton duck materials referred to above and impregnated in accordance with Example 1:

EXAMPLE 1

*Fabric Bonding and Reinforcing*

| Material: | Parts by weight, pounds |
|---|---|
| Phenol-formaldehyde resin (as specified above) | 234 |
| Alcohol solvent | 13.6 |
| Graphite (2 to 4 micron particle size) | 10.0 |

EXAMPLE 2

*Low Friction Coating*

Teflon "30" resin dispersion ----- 0.06 gram/in.$^2$ resin-impregnated fabric duck.

The speed of the duck material under the rollers R1 and R2 is approximately twenty feet per minute, and the drying stations are preferably at about 280° F. In the first impregnation, about 35% solids (resin solids plus any graphite) are applied to the cotton duck, and in the second operation this is raised to 42%, based on the weight of the fabric.

Continuing with Examples 1 and 2, the severed cotton duck lamina prepared in accordance with Example 1 are arranged in the desired number in a mold as 20, and these are topped off by an outer lamina prepared in accordance with Example 2. The mold is closed under a pressure of about 2500 p.s.i. (for thin elements) and a temperature of about 350° F. for about ten minutes is applied while maintaining this pressure. For thicker elements of more than three laminae up to one-inch thickness, the pressure will be about 3000 p.s.i. and a temperature of about 350° F. is maintained therewith for about one hour per inch of molded thickness. Such conditions completely cure the thermosetting bonding resin and firmly unite the Teflon resin to the outer lamina.

It was mentioned above that in accordance with the present invention it is found that the substrate or backing member represents a material difference insofar as a bearing is concerned. I have also found that while it may be immaterial for certain bearing applications whether the fabric laminae contain graphite or not, it is important that a thermosetting resin be present as the bonding or reinforcing material and at the Teflon containing surface of the fabric. Moreover, it is essential that the Teflon particles be pressed in situ in thermosetting resin which divides or separates the Teflon agglomerates or collected particles throughout the bearing area of the outermost face of the fabric backing during molding. Thus, as set forth in Tables I and II hereinafter, it will be noted that the steel test materials whether coated with the residue remaining after drying an aqueous dispersion of Teflon "30" resin or a continuous and uninterrupted fused film of Teflon resin, display a totally unacceptable wear rate when used as a bearing element. Moreover, the torque ranges in these two instances extend to an unacceptable upper value, and it was found that the bearing surfaces in both instances were galled after testing to failure.

As evidence of the need to anchor or fix by molding the Teflon particulate resin in situ as mentioned above, attention is directed to test bearing 113–95 which was laminated from the AB8 strips and wherein Teflon particles were applied after the AB8 lamina strips had been molded into the desired bearing element configuration, that is, after the laminae had been pressure consolidated and the bonding resin advanced to its infusible stage. Thus, while the life of the bearing in this instance was approximately double the test bearing 113–33, and while both the wear rate and torque range were lowered, the bearing ran hot and experienced a relatively short life. It will be appreciated that the torque values are a measure of friction. In contrast to this, bearing elements tested and composed of the laminated AB8 and AB0 strips, with Teflon particles applied before final molding and advancement of the bonding resin to its final stage of cure, displayed very low torque and, on average, had a wear rate of about 1/20 that of the 113-95 test material. Both bearings in this instance ran cool and the bearing surfaces at the end of the test were of excellent appearance, therefore evidencing no damage. It should be noted in this connection that after 207 hours of testing the 113-94 and 113-204 elements, the test was arbitrarily terminated since the desired specifications had already been attained. As to the P71 test bearing element, testing was arbitrarily terminated after the low values noted had achieved a plateau of constancy and it was determined that the life would be more than acceptable.

TEST RESULTS

*Table I*

ACCELERATED SEVERE TEST

| Test | Hours to Failure | Torque Range [1] | Total Wear [2] | Wear Rate [3] | Remarks |
|---|---|---|---|---|---|
| 113-96 | 0.2 | 72-600 | ---------- | ---------- | Galled. |
| 113-33 | 7.5 | 70-600 | 0.1755 | 23 | Do. |
| 113-95 | 15 | 66-360 | 0.2996 | 20 | Ran Hot. |
| 113-94 | [4] 207 | 60-90 | 0.1237 | 0.6 | Ran Cool—No Damage. |
| 113-204 | [4] 207 | 66-81 | 0.2681 | 1.3 | Do. |
| P71 | [4] 31.5 | 51-66 | 0.0204 | 0.7 | Do. |

[1] Lb-in. [2] Grams. [3] Mg./hr. [4] Test arbitrarily terminated.

*Table II*

MATERIALS

| Test | Backing | Low Friction Surface | Amount,[a] g./in.$^2$ | Remarks |
|---|---|---|---|---|
| 113-96 | Steel | Teflon "30" (dried). | 0.223 | |
| 113-33 | do | Fused Teflon Film. | ---------- | Continuous 0.001" thick film. |
| 113-95 | AB8 | Teflon "30" | 0.068 | Applied to AB8 after pressure mold AB8 laminae. |
| 113-94 | AB8 | do | 0.065 | Do. |
| 113-204 | AB0 | do | 0.065 | Applied to AB0 before pressure mold AB0 laminae. |
| P71 | AB0 | Teflon [b] | 0.2-0.3 | Do. |

[a] Teflon resin solids.
[b] Applied as large sized −20 to +30 mesh fused Teflon resin particles in epoxy resin vehicle.
AB8=phenolic-graphite impregnated cotton duck stock.
AB0=phenolic impregnated cotton duch stock-no graphite.

The data in Table I were obtained in an automotive ball joint test machine. The test parts identified in Table II were each of 1¾" OD, ⅞" ID and 3/16" to ¼" thick, and the opposing member was a part of SAE 1020 steel 1⅝" OD, ⅞" ID, 0.15-0.190 thick and honed to 20-25 micro inches (R.M.S.). The load was applied vertically (2200 pounds) and the opposing face rotated against the bearing surface sinusoidally through a 30° angle at a rate of 56 cycles per minute. Conditions were of course identical for each test. Each sample was measured and weighed at the begnning of the test. The test machine was run for five-hour periods and the torque measured periodically. At the end of each five-hour period, the test material was weighed and measured, and the test restarted for the next five-hour period. This was a laboratory test designed to simulate severe automotive service.

In a somewhat similar torque test conducted by a large domestic automobile manufacturing company, a bearing element constructed under the present invention was compared to two different bearings of the compound woven yarn type referred to hereinabove as incorporating yarns of Teflon resin. These different bearings were reportedly the best in the Teflon material line available commercially prior to the present invention for general automotive ball joint use, but in this test it was found that both these bearings displayed torque readings three times as high in comparison to the bearing of the present invention.

Figure 5:
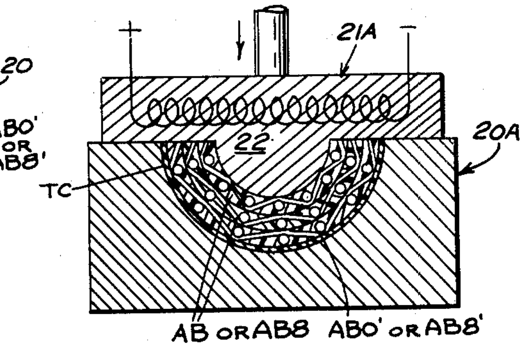
FIG. 5 illustrates another typical molding operation.
Figure 6:
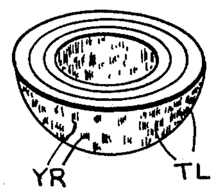
FIG. 6 is a perspective view of a bearing element in finished form removed from the mold in FIG. 5.

Bearing elements of the present invention can take many different forms and can be molded under heat and pressure in a mold 20A, FIG. 6, having a hemispherical mold cavity in which curved laminae are pressed and compacted by the pressure element 22 of a heated platen or ram 21A. The resultant bearing is shown in FIG. 6 and inasmuch as identical materials referred to above in connection with FIGS. 2, 4, 4A and 4B can be used, like reference characters have been used in FIGS. 5 and 6.

Figure 7:
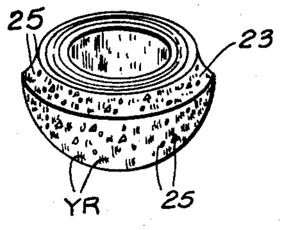
FIG. 7 shows another form of bearing element contemplated under the present invention.

A special form of bearing contemplated under the present invention is shown in FIG. 7. This bearing includes approximately ten laminae, and is essentially cup-shaped but has an annular thrust collar 23. This bearing has the Teflon resin in the form of large particles 25 initially applied by having resort to about 30 mesh size Teflon resin particles distributed in an epoxy or equivalent resin as mentioned above. In this connection, it should be mentioned that the flat end faces of the bearing elements shown in FIGS. 6 and 7 can bear Teflon resin to afford anti-friction thrust faces. It will be appreciated that the outer bearing faces of the low friction elements shown in FIGS. 6 and 7 can be afforded merely by initially locating in the mold a Teflon resin coated strip, bearing the phenolic-type bonding resin impregnant, thereafter placing in the mold the resin impregnated backing layers, and subsequently molding the assembly in the mold under the required heat and pressure to cure the bonding resin, consolidate the body, and anchor and press in situ the Teflon resin particles.

Figure 8:
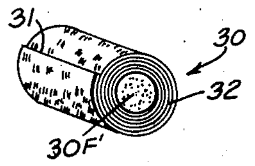
FIG. 8 shows another form of bearing element contemplated under the present invention.
Figure 8A:
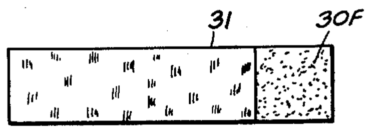
FIG. 8A illustrates the strip from which the bearing of FIG. 8 may be formed.

Another form of layered fabric strip low friction bearing element or the like contemplated under the present invention is illustrated at 30 in FIG. 8. In this instance, a woven fabric strip 31, FIGS. 8 and 8A, impregnated with an incompletely cured, thermosetting bonding resin in accordance with the disclosure above, is faced inward from one end thereof as shown in FIG. 8A, with a Teflon resin coating 30F. The coating 30F can be one obtained from Teflon resin particles in a water dispersion or in a resin vehicle as disclosed above. The area of the fabric strip 31 thus faced is to be sufficient to line the inside diameter of the bearing 30 with a resultant low friction facing 30F' of in situ pressed Teflon resin particles. The coating 30F may be next dried and the strip 31 then wound tight in the convolute form shown in FIG. 8, whereafter the wound body is pressed in a mold under conditions sufficient to completely cure the bonding resin and press in situ the Teflon resin material.

Figure 9:
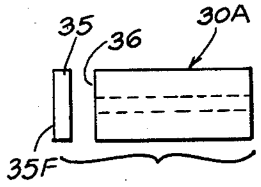
FIGS. 9 and 10 show still another form of bearing or like low friction element contemplated under the present invention.
Figure 10:
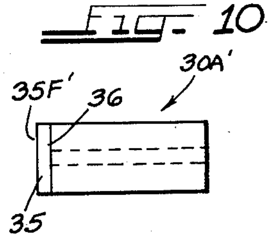

Alternatively or conjointly with the foregoing procedure, the end faces 32 of the convolute body 30 can be coated with Teflon resin, and pressure during molding is applied axially so that the Teflon resin particles at one or both of the end faces 32 will be pressed in situ to afford an operative thrust bearing face. Another way of accomplishing this is to separately coat the end face 35F, FIG. 9, of a pre-formed cap 35 of resin impregnated fabric material with the Teflon resin coating mixture in accordance with the foregoing disclosure, dispose this cap in a mold in contact with the end face 36 of a convolute body 30A of the sort disclosed above in connection with FIG. 8, and then apply heat and pressure in the mold to cure the resin and unite the cap to the convolute body 30A, producing the finished bearing 30A', FIG. 10. One or more caps 35 may be used and the outermost one at least, which is to afford the thrust bearing face, will bear Teflon resin. The fabric cap 35 and the convolute body 30A are of course both impregnated with the thermosetting bonding resin, which is to be cured and set during molding. Pressure is applied axially during molding whereby the Teflon resin particles are anchored in situ in the cured resin surface.

In all forms of bearings contemplated by the present invention, the backing is of resilient compressible fabric material as distinguished from incompressible metallic backings. The fabric backing can be but a single layer, woven or unwoven, or can be laminated to include two or more plies. The woven forms are exemplified by cotton duck, although other types of woven threads or strands can of course be used. The fabric layer can also be a sheet of loosely associated strands such as glass or asbestos fibers.

The fabric backing of whatever practical form or thickness is to be impregnated with a thermosetting resin which ultimately reinforces and bonds the fabric strands. Such resin may be phenolic, of the melamine type, an epoxy resin, or the like which will cure to a substantially rigid, infusible state. This involves a physical bond and reinforcing association between the resin and the fabric. The Teflon resin to be applied to the low-friction bearing face of the back is applied before the resin impregnant is finally cured and is applied in particulate form. Advantageously, this is accomplished by way of a coating procedure, using either a water dispersion of Teflon resin particles of colloidal dimension for thin substantially continuous network facings, or a distribution of larger sized Teflon particles in a thermosetting resin in liquid state. The advantage of the latter is that particles of selected size can be used, and this enables a low-friction surface of controlled thickness to be developed on the backing. Continuous roller coating is preferred for large production as depicted in FIG. 1. However, particularly in the instance of special bearing shapes and low production, the resin-impregnated backing fabric, before final pressure curing, can be coated with additional resin in a tacky state, such as an epoxy-liquid state, whereafter the Teflon resin particles can be sprinkled onto the tacky surface immediately prior to final heat and pressure shaping and curing. As in all instances where an epoxy or equivalent thermosetting resin in a tacky state is a vehicle or support for Teflon resin particles, so in this instance, the impregnant resin and the vehicle resin will bond one to another during final molding of the bearing, and the Teflon particles will be pressed into the resin at the bearing face of the bearing, which resin may be the vehicle resin, the impregnant resin or the interface between both, depending on the amounts available. This aspect of the invention will be further examined below.

It is also possible, in the instance of single ply or layer backings, to add the Teflon particles to the impregnant resin such as that applied by the roller R1 in FIG. 1. This can only be done, however, where the bond strength requirement in the fabric is not particularly high, because Teflon resin particles, if contained in the impregnating resin within the interior of the bearing backing, will detract from the bonding and reinforcing effect of the impregnating resin. Alternatively, in this connection, free Teflon particles in a free state can be sprinkled or dusted onto the impregnated strip as it emerges from the coating roller R1 or the coating roller R2. Additionally, in the instance of bearings or the like that are to have a single layer fabric backing, strips of predetermined length that are to afford such backings can be dipped into a Teflon resin coating, such as a Teflon "30" water dispersion, whereby Teflon resin particles will be picked up or occluded on both sides of the strip. As noted, these procedures should not be used for multi-layer elements.

Figure 11:
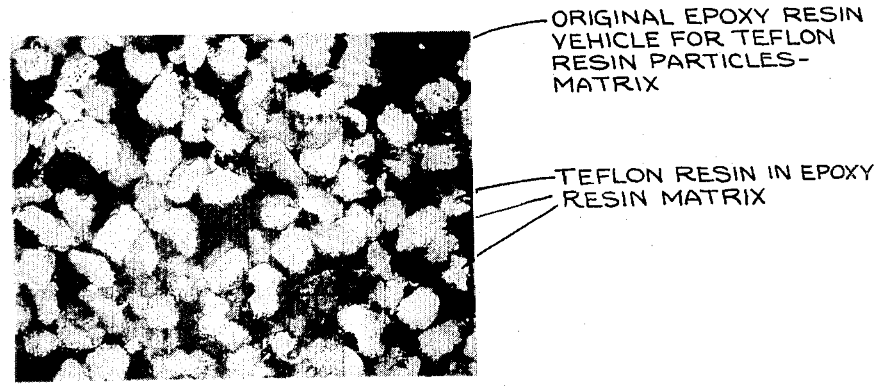
FIGS. 11 to 16 are photomicrographs (10×) of bearings manufactured under the present invention.
Figure 12:
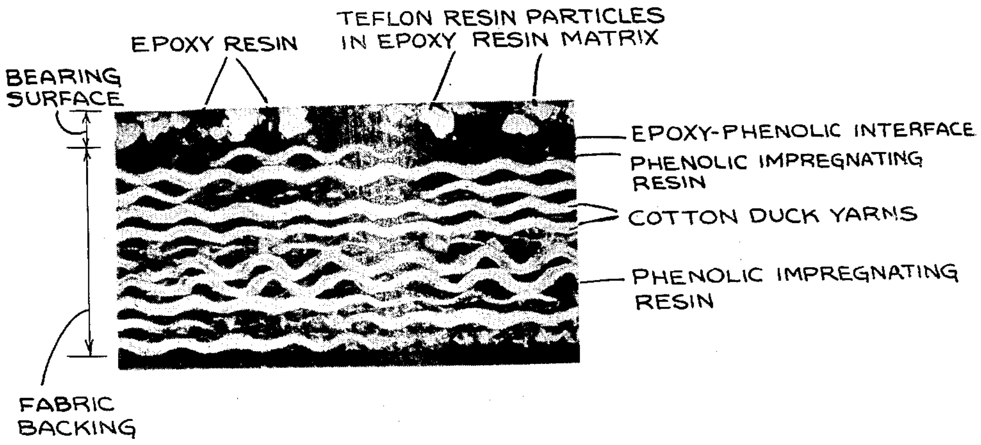

As will be apparent from the foregoing, the Teflon resin particles are in effect embedded in a resin matrix at the bearing face of the bearing or like element having a low-friction surface characterized by Teflon resin. This resin for the matrix will be either the impregnating resin or the vehicle resin used incidental to coating the large-sized Teflon particles on the fabric. That this is the case, and the net effect of pressing the Teflon particles in situ to so embed and anchor the same in the resin at the face of the bearing during molding, can be seen by reference to the photomicrographs of FIGS. 11 to 16 which show details (on a 10× scale) of actual bearings manufactured under the present invention. FIG. 11 is a photograph of the bearing face of a bearing element made under the present invention, and FIG. 12 is a cross-section thereof. The Teflon resin particles are discontinuously or randomly scattered in a thermoset epoxy resin matrix which, in liquid or uncured state, was the vehicle enabling the Teflon resin-containing coating to be spread on the outer backing lamina which had been impregnated with a phenol-formaldehyde (phenolic) resin. When the bearings were being molded, the Teflon particles were pressed into the then soft resin at the bearing face, the intermediate stage of the epoxy resin shown in FIGS. 11 and 12. Thus, the epoxy in its cured or thermoset state (the condition in FIGS. 11 and 12) becomes a matrix for the in situ pressed Teflon particles which, as ultimate agglomerates, are divided or separated by the thermoset resin. The interface between the phenolic and the epoxy resin is clearly apparent in FIG. 12. It will be recognized that by selecting Teflon particles of a particular size, the thickness of the bearing surface can be controlled.

Figure 13:
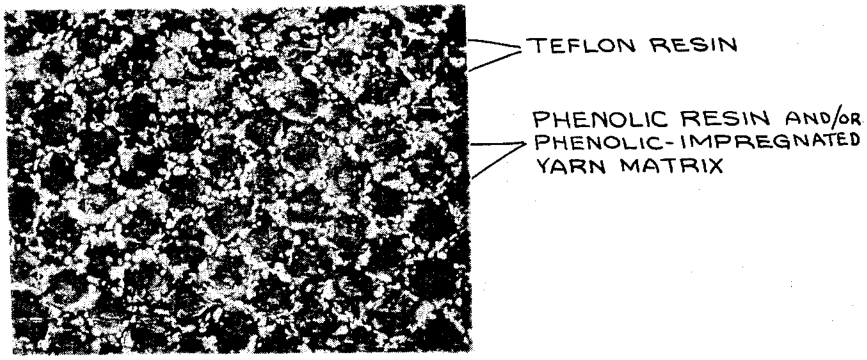
Figure 14:
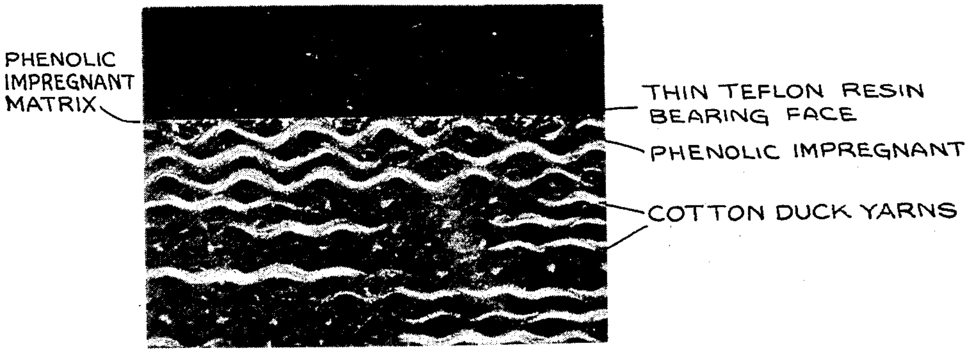
Figure 15:
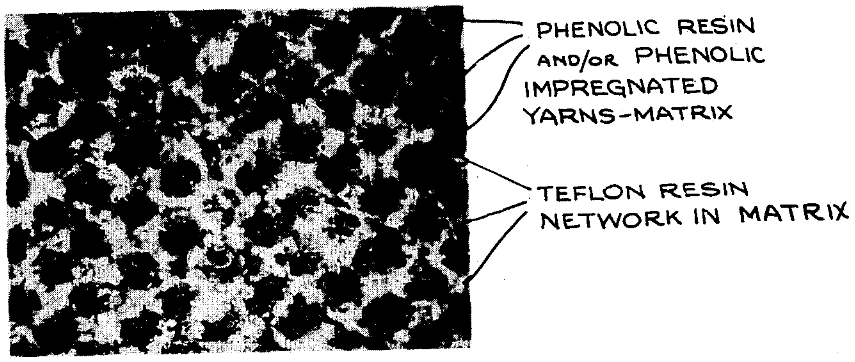
Figure 16:
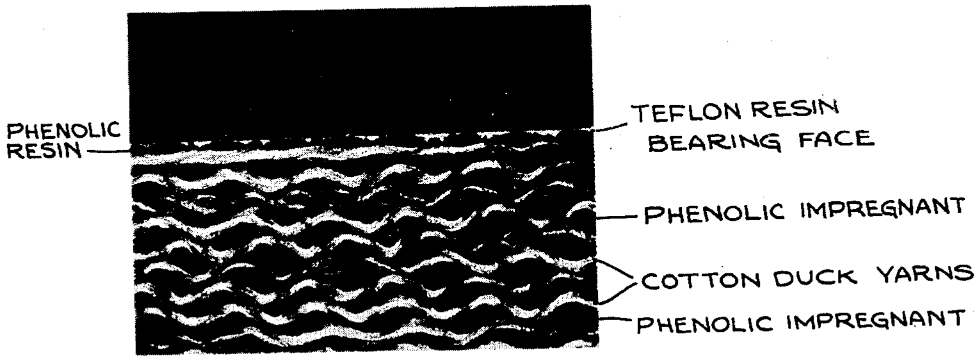

FIGS. 13 to 16 are typical of bearings produced when using a Teflon "30" water dispersion as the source of the ultimate Teflon resin low-friction bearing surface. The concentration of Teflon in the bearing of FIGS. 13 and 14 is approximately 0.065 gram/in.$^2$ bearing surface; that of FIGS. 15 and 16 is approximately 0.13 gram/in.$^2$ bearing surface. Thus, the distribution and thickness of the Teflon material for the bearing of FIGS. 13 and 14 is less in comparison to the bearing of FIGS. 15 and 16. In both instances, however, the Teflon resin at the bearing face assures a substantially continuous network in a matrix comprising the phenolic resin used to impregnate the fabric backing. However, this matrix may also include the phenolic-containing cotton yarns that compose the backing as will be evident particularly in FIG. 14, where the cotton duck yarns or threads extend to the Teflon resin face. In any event, the thermosetting resin available at the outer face of the backings to which the Teflon "30" resin dispersions are applied incidental to forming the bearings of FIGS. 13 to 16, constitutes a matrix for, and which divides or separates, the Teflon particles pressed in situ during molding, when the resin impregnant passes from a soft to a thermoset state.

The dark areas above the Teflon resin surfaces in FIGS. 14 and 16 is the background against which the photomicrographs were taken and which accentuate the Teflon resin facing.

It will be seen from the foregoing that under the present invention it is possible to manufacture essentially non-metallic, composition bearings, bushings or the like having low friction surfaces characterized by the presence of Teflon resin in a unique form, which is to say that the Teflon resin is pressed in situ at the time of heat and pressure molding of the fabric-type bearing as a whole.

In the instance of the finest Teflon resin particles (Teflon "30" dispersion) there may be some aggregating of the particles during heat and pressure molding, but in the instance of the approximately 30 mesh Teflon particles or chunks, these substantially retain their individual identity as shown in FIGS. 11 and 12.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A composition, essentially fabric-type bearing or like element having a low friction bearing surface and molded to shape under pressure to include a shock-absorbing backing for the bearing surface which backing is composed of at least one fabric strip containing a thermosetting resin to form a self-supporting body, and an outermost face of said backing having a low friction bearing surface characterized as inclusive of polytetrafluoroethylene resin in particulate form pressed in situ therein during molding of the bearing element such that the low friction bearing surface presents both thermosetting resin and polytetrafluoroethylene resin separated by thermosetting resin.

2. A composition, essentially fabric-type bearing or like element having a low friction bearing surface and molded to shape under heat and pressure to include a shock-absorbing backing for the bearing surface which backing is composed of a plurality of layers of fabric strands bonded directly one to another into a self-supporting body by a thermoset resin which impregnates the layers, and an outermost layer affording the backing having a bearing surface characterized as inclusive of polytetrafluoroethylene resin in particulate form pressed in situ therein during molding of the bearing element such that the low friction bearing surface presents both thermoset resin and polytetrafluoroethylene resin separated by thermoset resin, said strands in the interior of said backing being substantially devoid of said polytetrafluoroethylene resin.

3. A non-metallic composition bearing or like element having a low friction surface and molded to shape under pressure to include a shock-absorbing backing for the bearing surface which backing is composed of at least one layer of fabric strands resin-bonded one to another into a self-supporting body, and an exposed surface affording the backing having a bearing surface thereon characterized as inclusive of in situ pressed particulate polytetrafluoroethylene resin pressed during molding of the bearing element into the material at the bearing surface which is other than polytetrafluoroethylene resin.

4. A bearing element according to claim 3 wherein said polytetrafluoroethylene resin is present in a distribution of not less than about 0.02 gram per square inch.

5. A molded composition, essentially laminated fabric-type bearing or like element having a low friction surface characterized by the presence of polytetrafluoroethylene resin, and a backing of another material, said backing being composed of superimposed strips of woven fabric bonded one to another by a thermosetting resin cured during molding of the bearing, said bearing having a thermosetting resin at the exposed face of one of the outer strips composing the backing, and said outer strip of the backing having a bearing surface including polytetrafluoroethylene resin in particulate form pressed in situ into the thermosetting resin at the exposed face of said outer strip during molding of the bearing such that the low friction bearing surface presents both thermosetting resin and polytetrafluoroethylene resin separated by thermosetting resin.

6. A molded composition bearing or like low friction element having a low friction surface characterized by the presence of polytetrafluoroethylene resin, and a backing of another material, said backing being composed of at least one layer of fabric strands bonded one to another by a thermosetting resin cured during molding of the bearing, said bearing having a thermosetting resin at the exposed face of said layer, and said backing having a bearing surface including polytetrafluoroethylene resin in particulate form pressed in situ into the thermosetting resin at said exposed face of said layer during molding of the bearing such that the low friction bearing surface presents both thermosetting resin and polytetrafluoroethylene resin separated by thermosetting resin.

7. A bearing or like low friction element comprising a backing of resilient strand material containing a thermosettable bonding material, the bearing face of said strand material being characterized by in situ pressed polytetrafluoroethylene resin pressed into said bonding material which separates and divides said resin in particulate form.

References Cited in the file of this patent

UNITED STATES PATENTS

| | | |
|---|---|---|
| 2,958,927 | Kravats | Nov. 8, 1960 |
| 2,989,657 | Sampson | June 20, 1961 |
| 3,044,922 | Kappel | July 17, 1962 |